Patented Jan. 10, 1928.

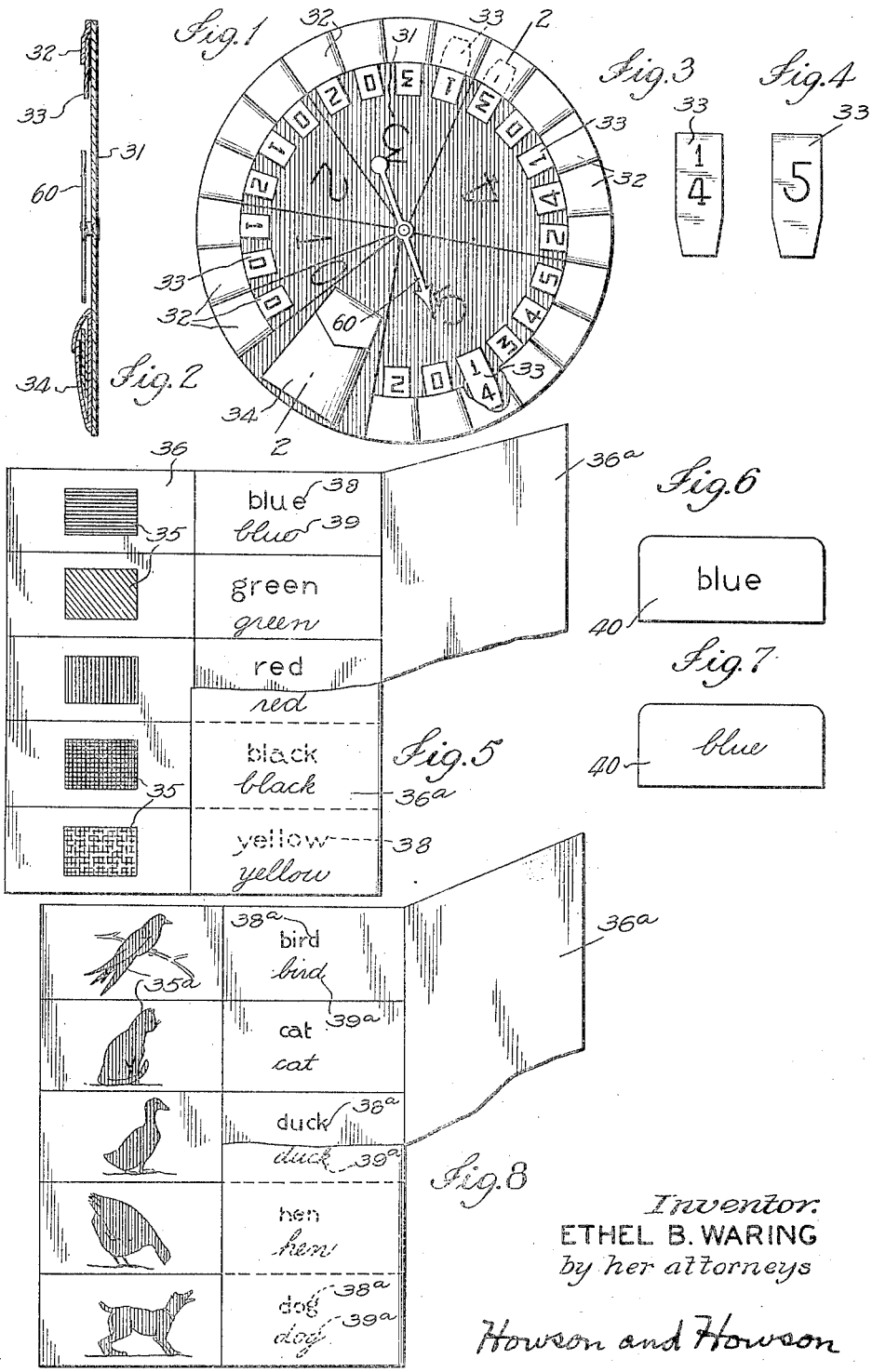

1,656,030

UNITED STATES PATENT OFFICE.

ETHEL B. WARING, OF NEW YORK, N. Y.

EDUCATIONAL MATERIAL.

Application filed October 4, 1924. Serial No. 741,587.

This invention relates to educational material for the instruction of young children, and more particularly such material as can be used profitably by children without supervision by a teacher.

The object of my invention is to produce educational materials which without immediate supervision of the teacher can be used by the child either to discover and teach himself new facts or to develop new abilities; as a test for the abilities or facts which he has acquired; or as a social or comptitive game with his comrades, which involves the exercise of abilities he has acquired or facts he has learned.

I have discovered that educational materials, in order to be adapted for use without a teacher in these three ways must have four essential characteristics. These four essential characteristics are: firstly, the material must serve to direct the child to the desired use or response; secondly, it must prevent the child from making habitual responses which are wrong; thirdly, it must show the child whether or not the specific responses he has made are correct; and fourthly, if the child's response is not correct it must show the child what the correct response is. These four essentials can be called self-suggestion, self-elimination, self-verification and self-correction.

To the end that the materials may have the four above-mentioned essential characteristics, I put in them at least three different classes or verieties of sense-impression objects, it being understood that a sense-impression object may take the form of one object, picture, letter, digit, color or the like source of mental stimulus or may be composed of a plurality of such parts. This leads to the recognition of familiar sense-impression objects and obvious relationship of some sense-impression objects, and through such recognitions, to the realization of the significance of unfamiliar sense-impression objects and of less obvious or unfamiliar relationships between other sense-impression objects. The sense-impression objects may themselves be physical objects or may be delineations mounted on physical objects. Each class of sense-impression objects has a different function. Sense-impression objects of what I arbitrarily term the first class represent the subject matter in which skill or recognition in use is desired. Sense-impression objects of what I term the second class have a significance related to the first but different therefrom in some respect. The two sense-impression objects may differ in organization or arrangement or have only some elements in common or either sense-impression object may constitute a part of the other, or each may be a different part of a common whole. A sense-impression object of the third class, which for convenience I shall call the checking sense-impression object, must be one whose meaning is either already familiar or is obvious to the child for whom the materials are planned, and must be physically so associated with one or both of the first two sense-impression objects that it is adapted to be hidden when both of them are visible.

I find it preferable to eliminate from my materials everything except the actual sense-impression objects and the physical objects on which they are mounted, making the latter as simple and insignificant as possible, although attractive and suggestive.

In describing my invention, I shall use the word "unit" to denote a single group of the three sense-impression objects. The unit must have in it at least one sense-impression object of each class.

The accompanying drawings illustrate several typical units of educational material made according to my invention.

In the drawings:

Fig. 1 is number work material which is designed to develop skill in addition and reveal certain relationships which underlie the process of subtraction;

Fig. 2 is a section on line 2—2 of Fig. 1;

Fig. 3 is one side of a dissociated card 33 shown in Fig. 1;

Fig. 4 is the reverse side of the card shown in Fig. 3;

Figs. 5, 6, and 7 show material designed to teach children printed and written symbols which stand for colors, the names of which are orally familiar to them;

Fig. 8 is part of material similar to that illustrated in Figs. 5, 6, and 7 but designed to teach the meaning of printed or written words standing for physical objects, the names of which are orally familiar to the child.

The material shown in Figs. 1, 2, 3, and 4 is a form of number work designed to develop accuracy and speed in recognition and manipulation of numeral or digit combinations or distinguished from number combinations represented by dots, etc. This material is based on a circular back piece 31, divided off into sectors of proportional size marked respectively with the digits 5, 4, 3, 2, 1, and 0. Around the outer edge of each sector of this circular support 31 are as many small pockets 32 as there are possible number combinations for the digit of the sector. Thus the zero sector has one pocket; the digit one sector has two pockets, namely 1 and 0, and 0 and 1; the digit two sector has 3 pockets, namely, 2 and 0, 1 and 1, 0 and 2, and similarly with the other sectors. There are combination cards 33 which are dissociated from the circular support 31 and its pockets 32. On one face of each of these cards is a combination of digits totaling the digit of the sector in one of whose pockets the card is designed to be placed. On the other side of this card is the digit of the sector (see Figs. 3 and 4). The pockets 32 are deep enough to cover one of the digits of the combination of digits shown on one face of the card (see Fig. 3) and there is a pocket 34 on the support 31 designed to contain the cards when not in use. The combination of digits such as shown in Fig. 3 is an addition combination and may be considered a sense-impression object of the first class, while the digits of the sectors of the circular support 31 may be considered the sense-impression objects of the second class. The digit on the back of the card 33 (see Fig. 4) may be considered the checking sense-impression-object.

It is obvious that a given sense-impression-object in a given unit of material may sometimes be used as what we have arbitrarily called the "Number one" sense-impression-object,—that is the thing to be learned,—and may some times be the "Number two" or the "Number three" sense-impression-object, according to the stage of development of the child.

This material shown in Figs. 1-4 can be used in the three different ways indicated above, namely, individually for learning, individually for testing knowledge or skill gained, and socially in group games. I will discuss the use of the material in these three ways, separately.

When using this material individually for learning, the child is interested primarily in learning what combination of digits when added give the result of a digit in one of the sectors on the circular support. One way of using the material is for the child to match the numerals or digits on the back of the cards 33 (the checking sense-impression-objects) with the corresponding digits on the circular support (the No. 2, sense-impression objects), then putting all the digit 5 cards in the small pockets around the outer edge of the sector bearing the digit 5, and so on, for the other sectors. In manipulating the cards to match them with the digits on the sectors, the child will observe the various digit combinations on the face of each card, which add together to equal the digit on the back. When he has placed all the cards in pockets on their corresponding sector, he may take them out one by one, turning each card over to see what digit combination is on the face of it.

After the relationships in the various units are so firmly in the child's mind that he thinks he knows the result of each digit combination (Fig. 3), he will attempt to use the material as a testing means by trying to place the cards in the pockets on the proper sectors using only the digit-combination side of the card. Then he can verify or correct the placements by turning the card and matching the checking digit with the digit on the sector. In this way, the child uses the set individually for testing to see how well he has learned the result of the combinations of digits. When he can say "I got them right", both he and the teacher know he is ready for other and more difficult material. He may also make use of this same material for speed and accuracy.

A "spinner" or clock hand 60 may be attached at the center of the back piece 31. When playing for accuracy the child may spin the spinner and try to get all the cards out of the pockets which the spinner indicated, by saying the hidden portion of the combinations on the cards. For example, if the spinner stops at "3", he may say, "1 and what are 3? 1 and 2 are 3; (and raising the card to verify) right." Then shifting to the next pocket, "3 and what are 3? 3 and 0 are 3. Right" and so on, replacing in the pocket any card for which he makes a misstatement. Or he may simply look at the cards and say the missing digits as 2, 0, 3, 1 verifying as he goes along.

The child who is accurate but slow in working, with these addition combinations may use the material for speed work. With a stop watch or a time piece with a second hand, he may time himself while he moves around the circle, saying each hidden digit and verifying. Then he may rearrange the cards and time again. In social and competitive games, the child may use the material as described either for speed or accuracy as far as the use of the symbols is concerned. For example, in a social game using this material for accuracy as described above, each child may in turn spin the clock hand, and say the hidden portion of the combination card at which the hand stops. If he says it correctly, he takes the card. If not, he must replace the card in its pocket. When all the cards have been taken, the child with the most cards has won the game.

In a similar manner any educational material made according to my invention can be used in these three ways because it has the four essential characteristics mentioned above, self-suggestion, self-elimination, self-verification, and self-correction.

The illustration of my invention which I have described relates to numbers, but my invention is applicable to many other lines of education. In Figs. 5, 6, and 7, I have shown material designed to teach children the printed and written words which stand for colors, it being assumed that those to whom this set is given already can distinguish the colors and name them orally. Blocks of color 35 are printed on a sheet, card or other appropriate medium 36 and by the side of each such block of color 35 appear the printed and written words, 38, 39 which stand for that color. If desired, only one form of the word need be shown. This series of words is adapted to be covered by folding over a flap 36ª forming part of the sheet 36. For each such color 35 there is a dissociated card 40 (see Figs. 6 and 7), on each side of which appears the word standing for that color on one side in printed form and on the other in script. The word need not be shown in both ways and need not be shown on two sides unless desired—one appearance of the word in any form, anywhere, on the card being sufficient. The words on these cards 40 can be considered the sense-impression-objects of the first class and the block of color 35 can be considered the sense-impression-object of the second class. The words 38 and 39 directly associated with the block of color on the sheet 36 can be considered the checking sense-impression-object.

In using the game as a means of learning, the child can take advantage of the checking sense-impression-objects since by their physical relationships with the blocks of color, they show the similarity and significance between the color and the words. If desired, the child can write on the fold 36ª but I find it preferable to let the child learn to place the separate cards 40 opposite the corresponding block of color.

The words 38 and 39 appearing on the card guide the child in placing the separate cards 40 where they belong. When using the game as a test, the child covers the checking sense-impression-object and attempts to place the separate cards 40 opposite their respective colors. He then uncovers the checking sense-impression-objects and verifies and corrects his placements. The game is used in an obviously similar manner when employed in social or competitive games. Like material may be used for many other lines of instruction other than color, and as an example of another line, I have shown in Fig. 8 part of similar material designed to teach the printed and written words 38ª and 39ª which stand for certain animals 35ª.

This material is completed by a dissociated card for each picture, bearing the printed and written words on its respective sides, or bearing a duplicate of the picture on one side, and the words on the other.

My material is constructed normally to hide one sense-impression-object of each unit while the other two sense-impression-objects of that unit are visible, that is to say, the material contains as an essential element a feature of construction which will bring about this normal hiding. For example, in Figs. 1, 2, 3 and 4, a unit would be composed of the following three sense-impression-objects; first, the combination of digits 1 and 4 shown on the face of card 33, in Fig. 3; second, the digit 5 on the circular support 31, and third or checking sense-impression-object, the digit 5 on the back of card 33, in Fig. 4.

Since the first and third sense-impression objects are on the front and back, respectively, of the same card, it is obvious that one of the three sense-impression-objects of the unit will normally be hidden while the other sense-impression-objects of that unit are visible.

Similarly in Figs. 5, 6 and 7, the flap 36ª is provided as an integral part of the construction, so that one sense-impression-object from each unit, i. e. the list of words on the card 36, may normally be hidden by the flap 36ª, while the other two sense-impression-objects of each unit, i. e., first the words on the separate cards 40 and second, the blocks of color 35 are visible.

From the above illustrations, adaptations of my invention into material covering knowledge facts, skills and abilities involved in the various branches of elementary education and suitable for children of specific ages or grades, will readily occur to those dealing with the problem. I have selected for purposes of illustration such material as involve the very simplest subject matter, as numbering processes through five and simplest word learnings, in order to emphasize and clarify the detail of the mechanical structure. It will be apparent also that my invention can be embodied in a variety of other materials for teaching the subjects which are taught by the games herein described. Materials can be made according to my invention for many other fields of education, such for example as writing, phonetics, nature study, geography, history, or civics, etc. The selection of suitable material, whether it be the selection by the teacher of materials to prepare or put into the child's learning environment, or the selection by the child of what he will will do at the moment, is determined in each case by the ability of the child to recognize the checking sense-impression-objects, and to appreciate the relation of the first class and second class sense-impression-objects, after he has brought them together in the course of his recognition and manipulation of the checking sense-impression-objects.

Such recognition is the stimulus for suggesting the right responses, preventing the wrong ones, verifying the right ones and correcting the wrong ones, which four characteristics of material made according to my invention enable it to be used by children to teach themselves, test what they have learned, and to acquire skill in what they have learned either alone or in social competitive games.

My invention is especially useful in developing in children habits of self-initiated and independent learning, of persistence in effort and of objective judgment of results; habits of accuracy, speed and progress; habits of organization of materials and ideas for definite purposes and habits of social adjustment and cooperation.

I claim as my invention:

1. An educational device consisting of units including three sense-impression-objects each, each of said units being in two parts, one of which parts is mechanically associated with the corresponding parts of the other units, and one of which parts carries two sense-impression-objects of a unit, while another part carries the third sense-impression-object thereof, and one of said parts being constructed to normally hide one of the sense-impression-objects of each unit while the other two sense-impression-objects of each unit are visible.

2. An educational device comprising units of three sense-impression-objects and a card bearing a sense-impression-object from each unit thereon, in combination with dissociated cards each bearing the remaining sense-impression objects of one of said units, each of said dissociated cards being constructed to normally hide one sense-impression-object of a unit while the other sense-impression-objects of said unit are visible.

3. An educational device comprising a dial bearing a series of numerals, in combination with a corresponding series of sets of cards, each card in a given set bearing on its back a numeral the same as one of the numerals on the dial, and on its face one of a series of combinations of numerals which upon application of a predetermined mathematical process will equal the number on the back of said card; pockets around the circumference of said dial to receive said cards, the numbers of pockets below each numeral on the dial being one more than the amount of said numeral.

In testimony whereof I have signed my name to this specification.

ETHEL B. WARING.